(12) United States Patent
Boutin

(10) Patent No.: US 9,365,168 B2
(45) Date of Patent: Jun. 14, 2016

(54) COLLAPSIBLE SUPPORT STRUCTURE FOR FLEXIBLE HOSES

(71) Applicant: Yvan Boutin, St-Georges (CA)

(72) Inventor: Yvan Boutin, St-Georges (CA)

( * ) Notice: Subject to any disclaimer, the term of this patent is extended or adjusted under 35 U.S.C. 154(b) by 0 days.

(21) Appl. No.: 14/800,882

(22) Filed: Jul. 16, 2015

(65) Prior Publication Data
US 2016/0018022 A1    Jan. 21, 2016

(30) Foreign Application Priority Data

Jul. 16, 2014   (GB) .................................. 1412670.0

(51) Int. Cl.
*A62C 13/76*   (2006.01)
*B60R 15/04*   (2006.01)
*F16L 3/26*    (2006.01)
*F16L 57/02*   (2006.01)

(52) U.S. Cl.
CPC . *B60R 15/04* (2013.01); *F16L 3/26* (2013.01); *F16L 57/02* (2013.01)

(58) Field of Classification Search
CPC ........... F16L 3/015; F16L 3/1066; F16L 3/26; F16L 3/10; F16L 3/1226; F16L 57/02; B05B 15/063; E03F 1/008; E03C 1/021; B60R 15/04
USPC .......... 138/119, 106, 108; 248/76, 91, 92, 93, 248/80, 81, 49, 164, 75
See application file for complete search history.

(56) References Cited

U.S. PATENT DOCUMENTS

| | | | |
|---|---|---|---|
| 701,901 A * | 6/1902 | Lewis | F16M 11/00 248/164 |
| 815,382 A | 3/1906 | Rush | |
| 2,310,770 A | 2/1943 | Ewans | |
| 2,568,996 A | 9/1951 | Evans | |
| 3,169,741 A | 2/1965 | Bittner | |
| 3,327,869 A | 6/1967 | Guhl et al. | |
| 3,493,204 A | 2/1970 | Prouty | |
| 3,809,348 A * | 5/1974 | Di Laura | E03F 1/008 138/106 |
| 3,819,137 A | 6/1974 | Smith | |
| 4,082,242 A | 4/1978 | Smith | |
| 4,403,758 A * | 9/1983 | Burt | F16L 3/26 248/49 |
| 4,692,050 A | 9/1987 | Kaufman | |
| 4,722,500 A * | 2/1988 | Bray | F16L 3/00 138/106 |
| 5,431,455 A | 7/1995 | Seely | |
| 6,619,596 B1 | 9/2003 | Caine et al. | |
| 7,425,028 B1 * | 9/2008 | Angel | B60R 11/00 16/422 |
| D669,761 S | 10/2012 | Angel | |
| 2007/0210215 A1 * | 9/2007 | Prest | F16L 3/26 248/80 |

FOREIGN PATENT DOCUMENTS

CA          754002        7/1967

* cited by examiner

Primary Examiner — Christopher E Garft

(57) ABSTRACT

A collapsible support structure for flexible hoses has a plurality of X-frames, each X-frame consisting of two opposing pairs of stringers, each pair of stringers is hingedly connected together at an axis point in the center region of each stringer, the pairs are connected at the distal ends of the stringers by bridge members (24), and adjacent X-frames are hingedly connected together at the distal ends of their stringers.

8 Claims, 6 Drawing Sheets

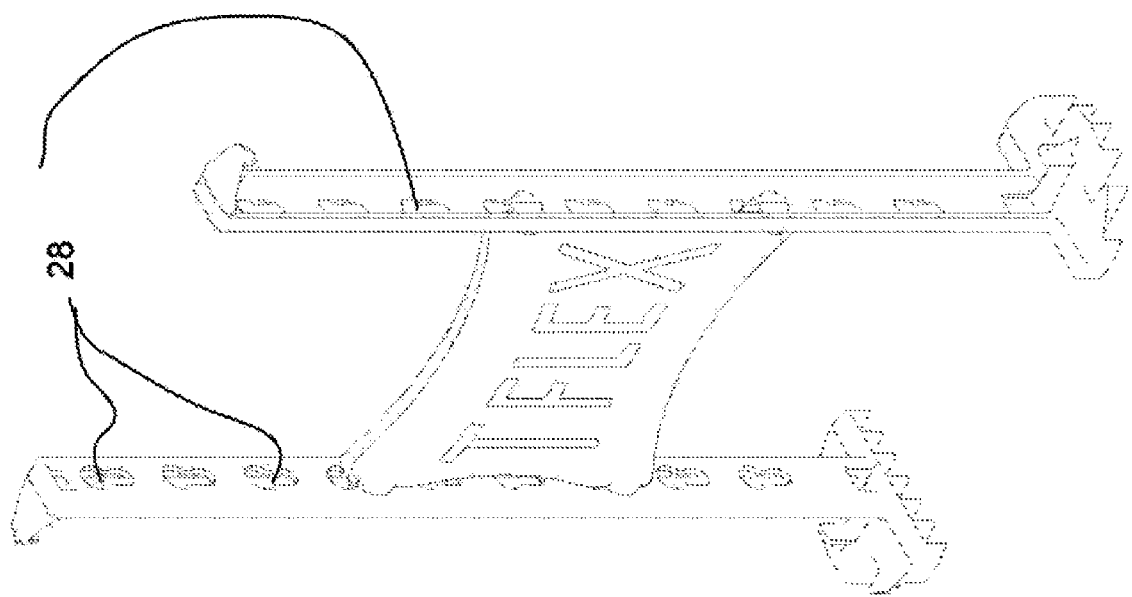

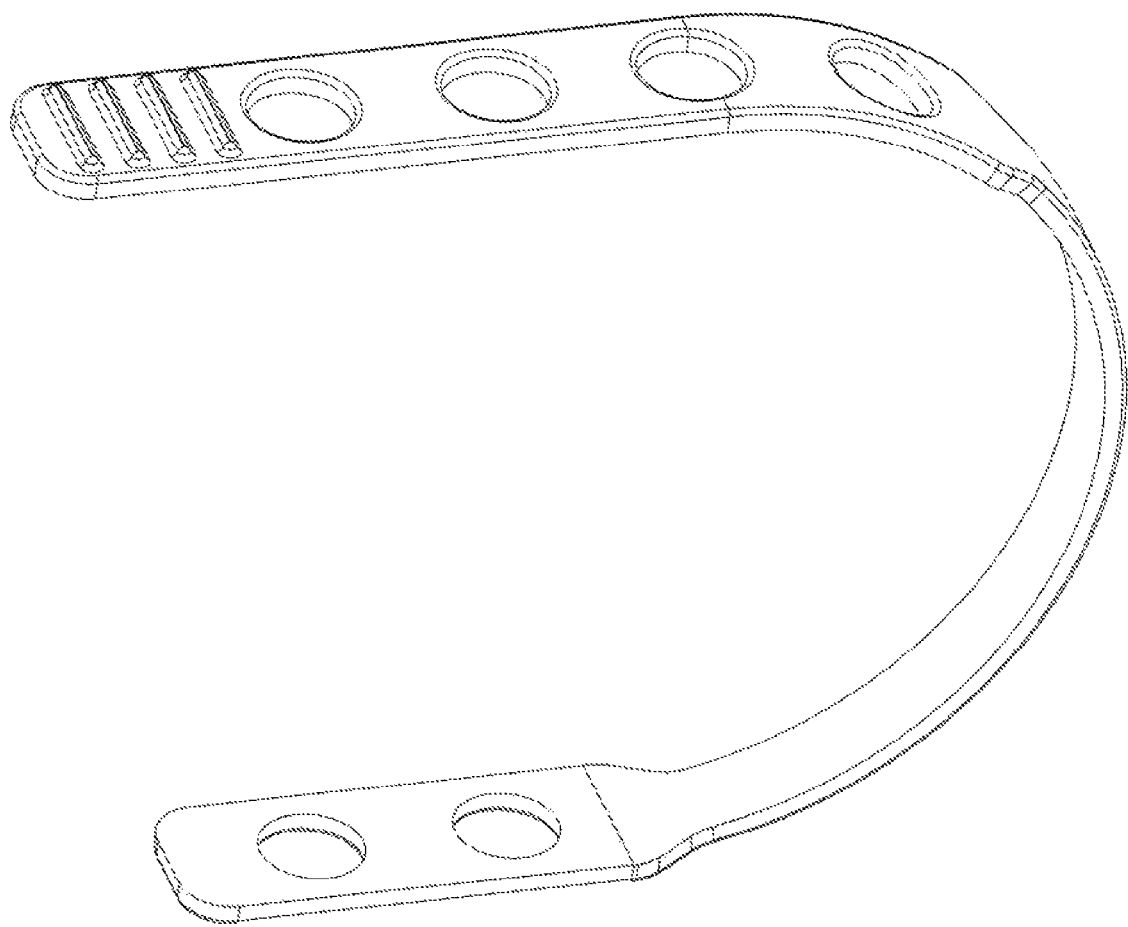

COLLAPSIBLE SUPPORT STRUCTURE FOR FLEXIBLE HOSES

FIELD OF THE INVENTION

The present invention relates generally to support structures but more particularly to a collapsible support structure for flexible hoses.

BACKGROUND OF THE INVENTION

In the world of camping, there is a need to empty the toilets from the caravan into a septic tank. In order to do so, there is a hose that connects between a connector on the outside wall of the caravan and the inlet leading to the septic tank. The problem is that the flexible hose being used for doing so is sometimes twisted and dangling in a configuration that does not allow for proper flow of the effluent. For example, the hose could sag mid point and trap some effluents; the slope could go slightly upward; or the downward slope could be non-existent; the curves could be too tight and create kinks. All these factors can interrupt the flow but can also damage the hose and cause premature leaking.

SUMMARY OF THE INVENTION

In view of the foregoing disadvantages inherent in the known devices now present in the prior art, the present invention, which will be described subsequently in greater detail, is to provide objects and advantages which are:

To provide for a collapsible support structure for flexible hoses.

In order to do so, the collapsible support structure in accordance with the invention comprises a plurality of "X" frames connected together to form a collapsible structure that can vary it's length so as to accommodate a variety of hose lengths, but more importantly, be very compact in storage, when not in use.

Each X-frame of the support structure consists of two opposing pairs of stringers, and each pair of stringers is hingedly connected together at an axis point in the center region of each stringer. The pairs are connected to each other at the distal ends of the stringers by bridge members. The bridge members keep the pairs of stringers at a certain distance of each other so that each X-frame defines a rectangle. The width of this rectangle is defined by the size of the bridge members, and the height by the size of the stringers and the angular position of two stringers of a pair to one another.

Adjacent X-frames of the support structure are hingedly connected to each other at their distal ends.

The length of the support structure can be adjusted by pulling on one end of the structure whereby the hinged connections of the stringers of each pair as well as the hinged connection of the distal ends of adjacent X-frames allow the structure to change its length.

In one embodiment of the support structure according to the invention the bridge members are rotatable.

In another embodiment the support structure comprises support elements so that the structure can be placed on the ground. The support elements may comprise support elements comprising at least two legs that are connected by a connecting member. The support structure may in particular be H-shaped.

Preferably, the support elements have fixation elements for detachably fixing the support structure to the support elements. The support elements may have a plurality of fixation elements in different heights, in particular slotted holes. The legs of the support elements may comprise footings, so that the support elements may be fixed to the ground in a generally known manner.

The support structure may have at least one fixation element for fixing a hose to the structure at one of its extremities, in particular a stirrup strap.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiment of the invention.

BRIEF DESCRIPTION OF THE DRAWINGS

FIG. 5 Isometric view of an "H" support frame.
FIG. 6 Isometric view of the adjustable stirrup strap.

DETAILED DESCRIPTION

Figure 1:
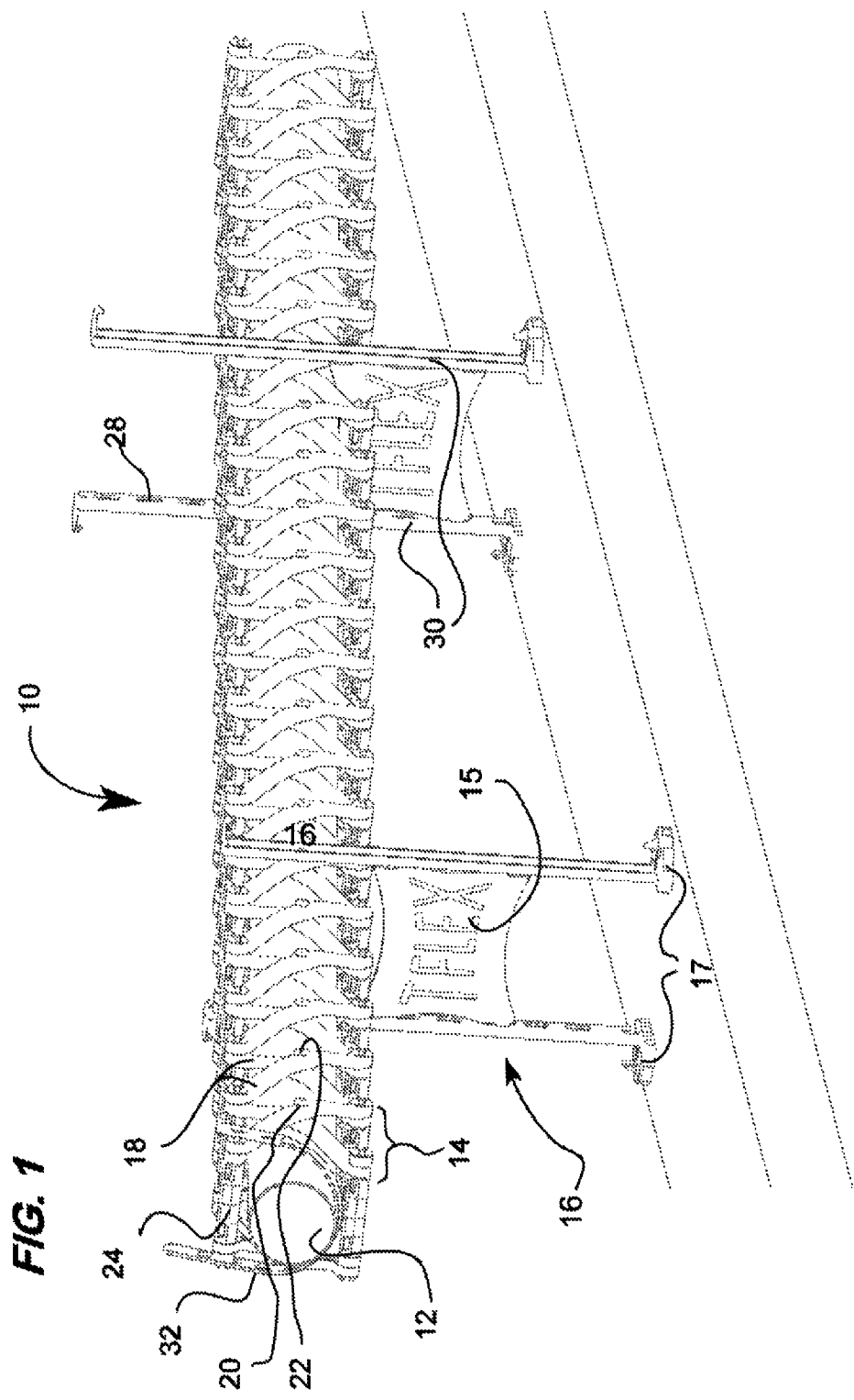
FIG. 1 Isometric view of the invention extended.
Figure 2:
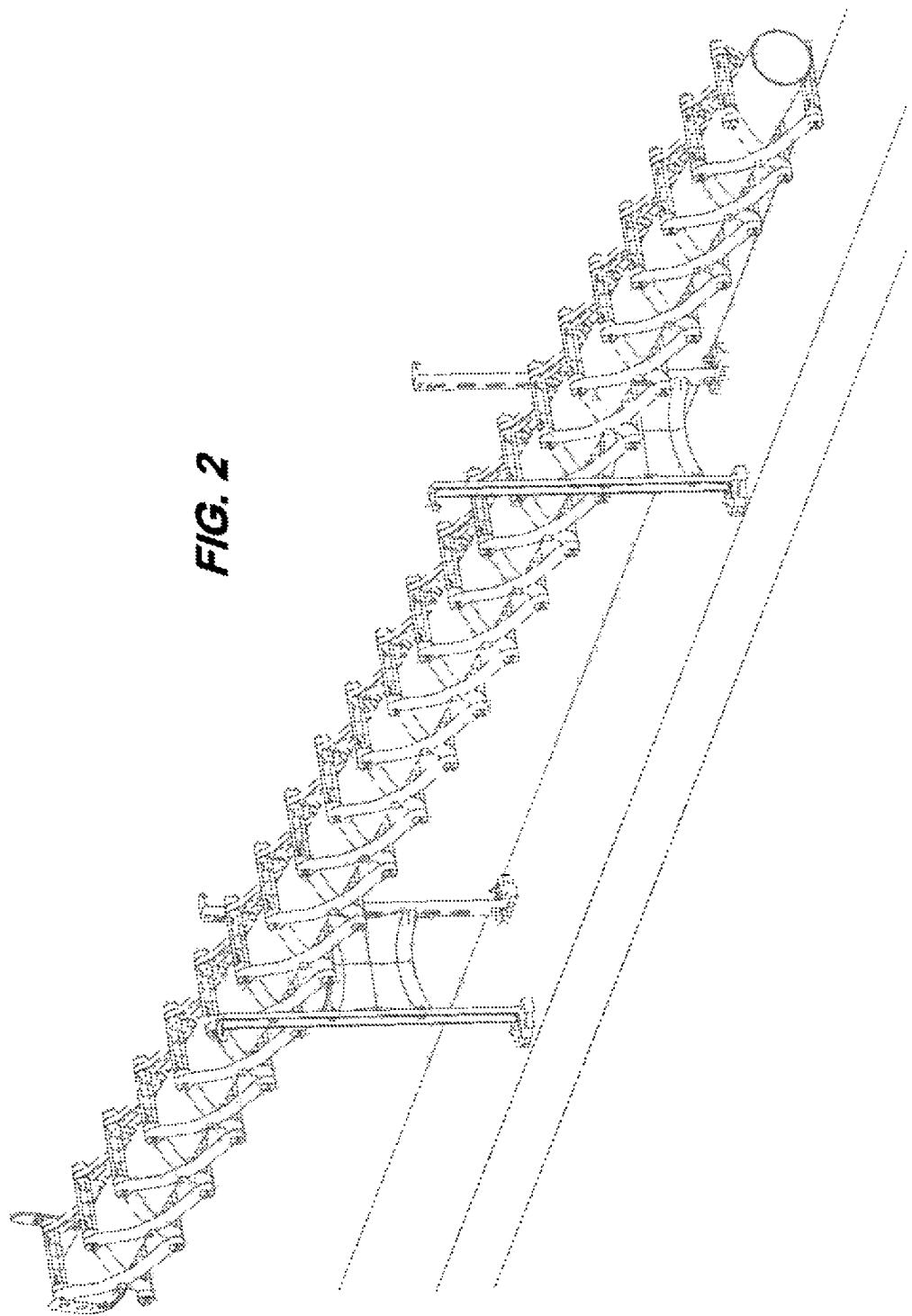
FIG. 2 Reverse angle view of FIG. 1
FIG. 3 Front view of an "X" frame member.
Figure 3:
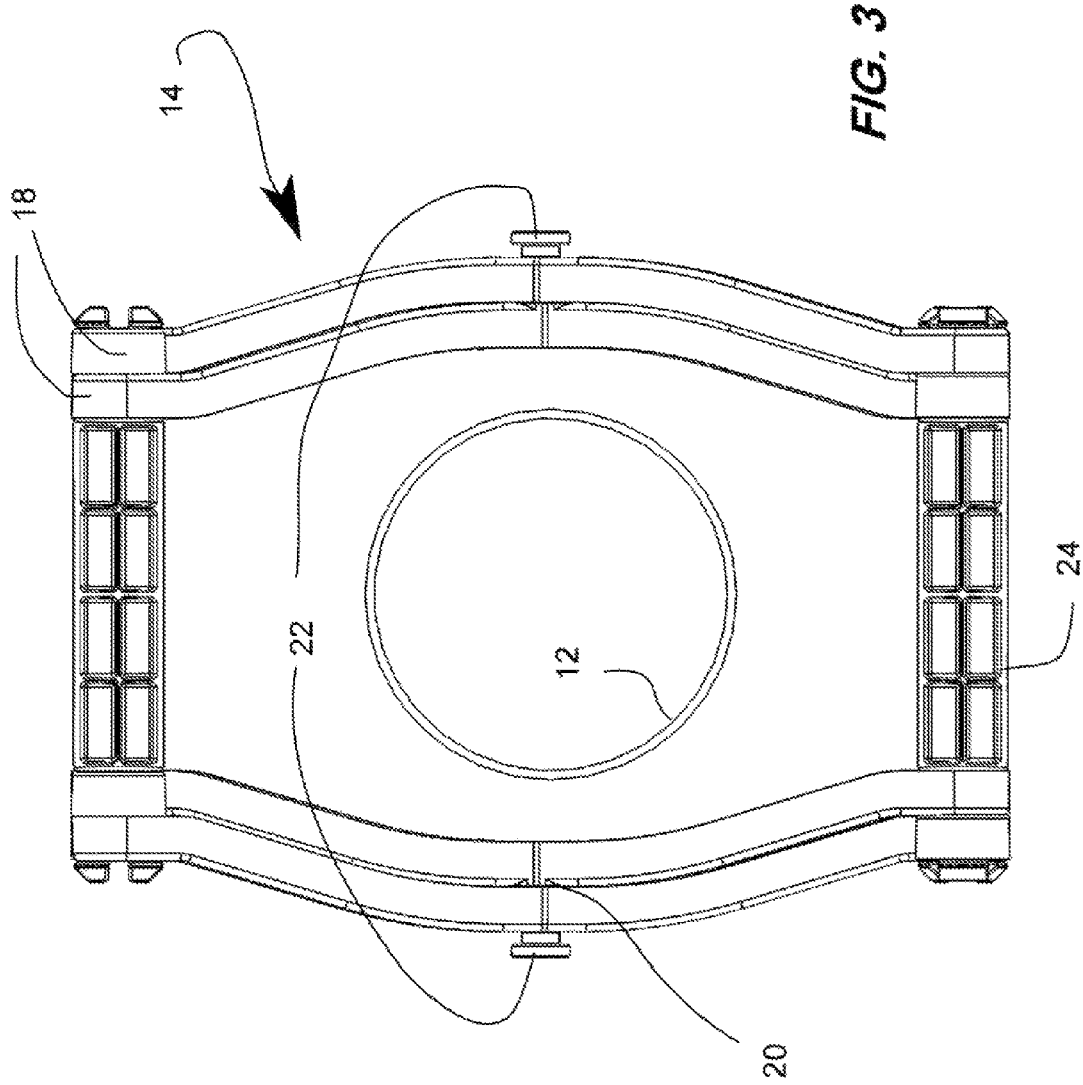
Figure 4:
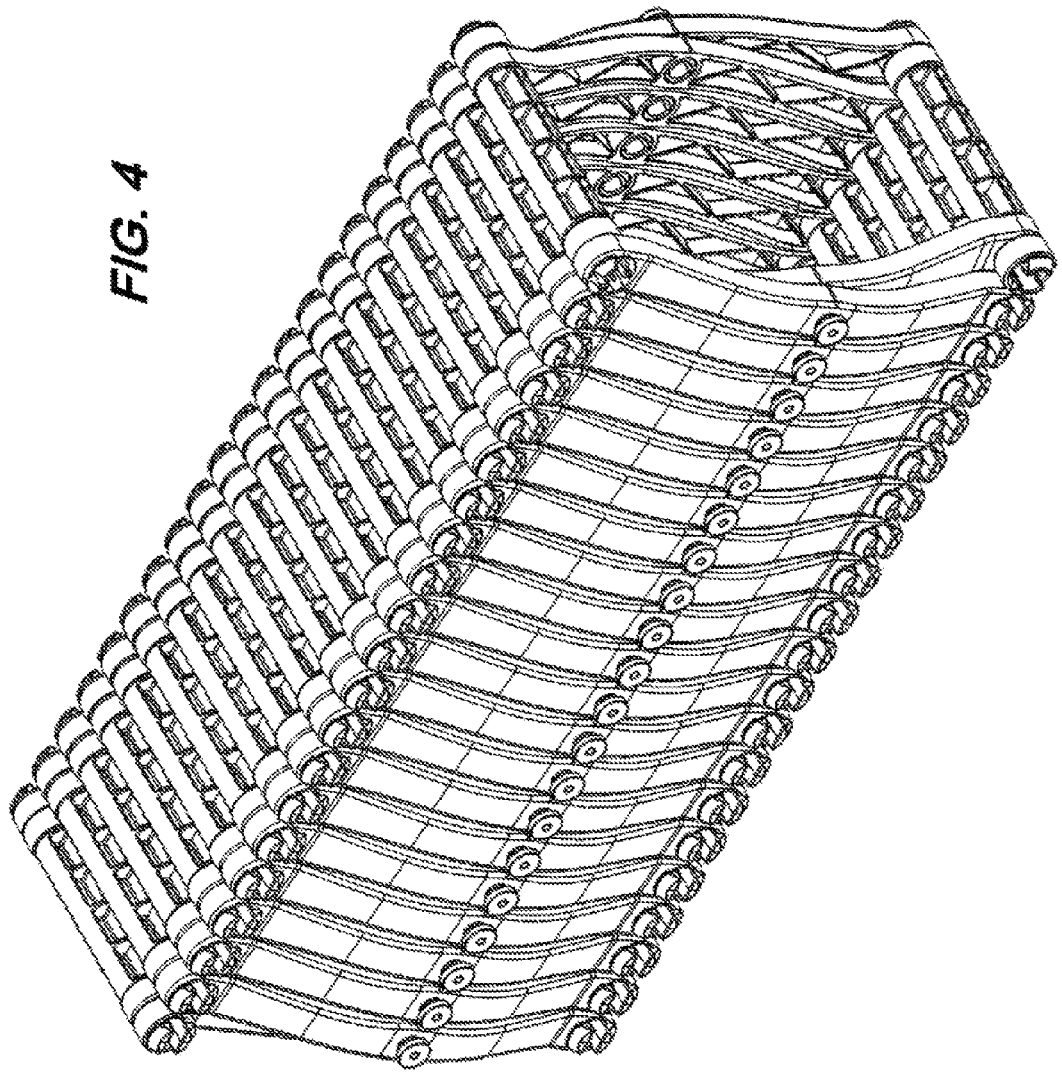
FIG. 4 Isometric view of the invention compressed.

A collapsible support structure (10) for a flexible hose (12) has a plurality of "X" frame members (14) hingedly connected together. Adjustable support elements (16) can be located at any given "X" frame member (14) location along the length of the structure (10). The support elements (16) are generally of an "H" shape configuration and have footings (17) through which stakes (not shown) can be planted so as to secure the support elements (16) into the ground. Each "X" frame member (14) consists in two pairs of crossed stringers (18). Each pair has its stringers (18) connected at an axis point (20) by way of a connector knob (22) that allows for the stringers (18) to rotate around the axis point (20). Each pair of crossed stringers (18) is hingedly connected to another pair of cross stringers (18) by connecting their distal ends together by way of a bridge member (24). An adjustable stirrup strap

(32) secures the hose (12) at its starting point. The stringers (18) on one side can be extended differently than on the opposite side so that a curved path can be traced so it is not limited to a straight line. The degree of the slope of the support structure (10) can be adjusted according to the slope of the terrain, if any.

The hose (12) is placed inside the support structure (10) which can then be elongated and given a slope by adjusting the height of each support element (16). The height is adjusted by placing one knob connector (22) per side inside one of a plurality of fixation elements (28), shaped like slotted holes, per side, located along the height of each leg (30) forming an integral part of the support element (16). The legs (30) are connected by way of a connecting member (15).

The bridge members (24) are rotatable so that they act much like a rolling conveyor so as to help pass the hose (12) through.

In use, a user connects one end of the hose (12) to a caravan waste outlet (not shown), pass the hose (12) through the compressed structure (10), and then extends the structure (10) as the support elements (16) are adjusted for height all the way so as to give the hose (12) a good slope leading to the inlet of a septic tank (not shown).

The support system (10) is made of durable and resilient material that is lightweight. Preferably, but not limited to polypropylene.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A collapsible support structure for flexible hoses comprising a plurality of X-frames; each X-frame consisting of two opposing pairs of stringers; each pair of stringers being hingedly connected together at an axis point in a center region of each stringer; the pairs of stringers being connected at distal ends of the stringers by bridge members; adjacent X-frames being hingedly connected together at the distal ends; said bridge members being rotatable; said stringers having an arcuate shape configured and sized to receive a hose therein, and wherein said hose is confined between said bridge members and said stringers.

2. A collapsible support structure according to claim 1, characterized in that the support structure comprises support elements.

3. A collapsible support structure according to claim 2, characterized in that the support elements comprise two legs that are connected by a connecting member.

4. A collapsible support structure according to claim 2, characterized in that the support elements are H-shaped.

5. A collapsible support structure according to claim 2, characterized in that the support elements have fixation elements for detachably fixing the support structure to the support elements.

6. A collapsible support structure according to claim 5, characterized in that the support elements have a plurality of fixation elements in different heights.

7. A collapsible support structure according to claim 2, characterized in that the legs of the support elements comprise footings.

8. A collapsible support structure according to claim 1, characterized in that the structure has at least one stirrup strap for fixing a hose to the X-frames at one end.

* * * * *